US009618723B2

(12) United States Patent
Suzuki (10) Patent No.: US 9,618,723 B2
(45) Date of Patent: Apr. 11, 2017

(54) IMAGE CAPTURING APPARATUS, CONTROL METHOD THEREOF, LENS UNIT, AND IMAGE CAPTURING SYSTEM

(71) Applicant: CANON KABUSHIKI KAISHA, Tokyo (JP)

(72) Inventor: Hiroto Suzuki, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/707,498

(22) Filed: May 8, 2015

(65) Prior Publication Data

US 2015/0334288 A1    Nov. 19, 2015

(30) Foreign Application Priority Data

May 13, 2014   (JP) .................................. 2014-099833

(51) Int. Cl.
  *H04N 5/232*   (2006.01)
  *G02B 7/28*    (2006.01)
  (Continued)

(52) U.S. Cl.
  CPC ................. *G02B 7/36* (2013.01); *G02B 7/34* (2013.01); *G03B 13/36* (2013.01);
  (Continued)

(58) Field of Classification Search
  CPC . G02B 7/36; G02B 7/34; G02B 7/285; H04N 5/232; H04N 5/23212; G03B 13/36; G03B 17/14; G03B 2206/00; G03B 19/12
  See application file for complete search history.

(56) References Cited

U.S. PATENT DOCUMENTS 8,351,777 B2 * 1/2013 Nakazawa ............. G02B 7/282
                                                      396/125
2003/0189662 A1 * 10/2003 Matsuda ............ H04N 5/23212
                                                      348/345

(Continued)

FOREIGN PATENT DOCUMENTS

JP    2007-212933 A    8/2007
JP    2010-197646 A    9/2010

(Continued)

OTHER PUBLICATIONS

The above references were cited in a Jan. 11, 2017 Korean Office Action, a copy of which is enclosed without an English Translation, that issued in Korean Patent Application No. 10-2015-0062881.

*Primary Examiner* — Roberto Velez
*Assistant Examiner* — Tuan Le
(74) *Attorney, Agent, or Firm* — Cowan, Liebowitz & Latman, P.C.

(57) ABSTRACT

An image capturing apparatus to which a lens unit having an optical imaging system is attachable, comprising: an image sensor configured to generate an image signal by performing photoelectric conversion on a light flux passing through the optical imaging system; a first calculation unit configured to obtain first control information for focus control by using a signal output from the image sensor; and a second calculation unit configured to obtain second control information for focus control without using a signal output from the image sensor, and transmit the second control information to the lens unit. The first calculation unit transmits the first control information to the lens unit without mediation of the second calculation unit.

21 Claims, 7 Drawing Sheets

(51) Int. Cl.
  *G02B 7/36* (2006.01)
  *G03B 13/36* (2006.01)
  *G02B 7/34* (2006.01)
  *G03B 17/14* (2006.01)
  *G03B 19/12* (2006.01)

(52) U.S. Cl.
  CPC ..... *H04N 5/23209* (2013.01); *H04N 5/23212* (2013.01); *G03B 17/14* (2013.01); *G03B 19/12* (2013.01); *G03B 2206/00* (2013.01); *H04N 5/23245* (2013.01)

(56) References Cited

U.S. PATENT DOCUMENTS

| | | | | |
|---|---|---|---|---|
| 2006/0008265 | A1* | 1/2006 | Ito | H04N 5/23212 396/125 |
| 2007/0189745 | A1* | 8/2007 | Masuda | H04N 5/23209 396/55 |
| 2011/0115966 | A1* | 5/2011 | Ueda | G02B 7/08 348/345 |
| 2012/0163786 | A1* | 6/2012 | Murashima | G03B 13/36 396/91 |
| 2012/0262623 | A1* | 10/2012 | Taguchi | H04N 5/23212 348/349 |
| 2012/0274837 | A1* | 11/2012 | Yamasaki | G02B 7/285 348/360 |
| 2013/0201385 | A1* | 8/2013 | Shukuin | H04N 5/23212 348/349 |
| 2013/0329118 | A1* | 12/2013 | Hongu | H04N 5/23209 348/345 |
| 2014/0071336 | A1* | 3/2014 | Takanashi | H04N 5/23209 348/360 |

FOREIGN PATENT DOCUMENTS

| | | |
|---|---|---|
| JP | 2012-220631 A | 11/2012 |
| JP | 2014-013360 A | 1/2014 |
| JP | 2014-057187 A | 3/2014 |
| KR | 10-2012-0093380 A | 8/2012 |

* cited by examiner

IMAGE CAPTURING APPARATUS, CONTROL METHOD THEREOF, LENS UNIT, AND IMAGE CAPTURING SYSTEM

BACKGROUND OF THE INVENTION

Field of the Invention

The present invention relates to an image capturing apparatus, a control method thereof, a lens unit, and an image capturing system, and particularly to control at a time of focus adjustment.

Description of the Related Art

In recent years, due to digitization of single-lens reflex cameras, single-lens reflex digital cameras that are capable of performing live-view shooting and moving image shooting as well as still image shooting have become common. Generally, the auto-focus (AF) method used in a single-lens reflex digital camera is different in the case of still image shooting and in the case of moving image shooting or live-view shooting that allows the user to check the subject on the liquid crystal monitor of the camera while shooting an image.

Japanese Patent Laid-Open No. 2010-197646, for example, discloses a lens control system for an interchangeable-lens cameras, as follows: first, during still image shooting, a portion of the light flux of the subject image entering via an imaging lens is reflected toward an AF sensor by a sub mirror inserted in the light path, and thus a pair of image signals are generated by the AF sensor. A camera CPU calculates a defocus value based on the phase difference between the pair of image signals, and drives a focus lens by communicating with a lens unit according to the result of the calculation, thereby focusing on the subject.

During moving image shooting or live-view shooting, a main mirror (instant-return mirror) and the sub mirror are flipped up and are thereby withdrawn from the light path so that the subject image entering via the imaging lens is incident on an image sensor. An image processor calculates a contrast value and so on based on image information acquired from the image sensor, and transmits values thus calculated to the camera CPU via communication. The camera CPU performs communication with the lens unit according to the information from the image processor, and focuses on the subject.

In the conventional art disclosed in Japanese Patent Laid-Open No. 2010-197646, communication with the lens unit is always performed via the camera CPU, and the camera CPU generates information for controlling the driving of the imaging lens. For this reason, in order to transmit an instruction for controlling the driving of the focus lens to the lens unit during moving image shooting or live-view shooting, the image processor needs to transmit a contrast evaluation value used for generating information for controlling the driving of the focus lens, to the camera CPU via communication. In this way, it is necessary to perform two-step communication processing in order to transmit an instruction to drive the focus lens to the lens unit, and there is the problem that a time lag occurs due to the communication.

SUMMARY OF THE INVENTION

The present invention has been made in consideration of the above situation, and shortens a time lag caused by controlling driving of a focus lens in an interchangeable-lens system.

According to the present invention, provided is an image capturing apparatus to which a lens unit having an optical imaging system is attachable, comprising: an image sensor configured to generate an image signal by performing photoelectric conversion on a light flux passing through the optical imaging system; a first calculation unit configured to obtain first control information for focus control by using a signal output from the image sensor; and a second calculation unit configured to obtain second control information for focus control without using a signal output from the image sensor, and transmit the second control information to the lens unit, wherein the first calculation unit transmits the first control information to the lens unit without mediation of the second calculation unit.

Further, according to the present invention, provided is a lens unit that is attachable to the above-mentioned image capturing apparatus, comprising: an optical imaging system; and a lens control unit configured to perform communication with the image capturing apparatus, and to control driving of the optical imaging system, wherein the lens control unit transmits, to the first calculation unit, first lens information used for image processing.

Furthermore, according to the present invention, provided is a method for controlling an image capturing apparatus to which a lens unit having an optical imaging system is attachable and that includes an image sensor that generates an image signal by performing photoelectric conversion on a light flux passing through the optical imaging system, the method comprising: obtaining, in a first calculation unit, first control information for focus control by using a signal output from the image sensor; obtaining, in a second calculation unit, second control information for focus control without using a signal output from the image sensor; transmitting the second control information from the second calculation unit to the lens unit; and transmitting the first control information from the first calculation unit to the lens unit without mediation of the second calculation unit.

Further, according to the present invention, provided is an image capturing system comprising: a lens unit having an optical imaging system; an image sensor configured to generate an image signal by performing photoelectric conversion on a light flux passing through the optical imaging system; a first calculation unit configured to obtain first control information for focus control by using a signal output from the image sensor; and a second calculation unit configured to obtain second control information for focus control without using a signal output from the image sensor, and transmit the second control information to the lens unit, wherein the first calculation unit transmits the first control information to the lens unit without mediation of the second calculation unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
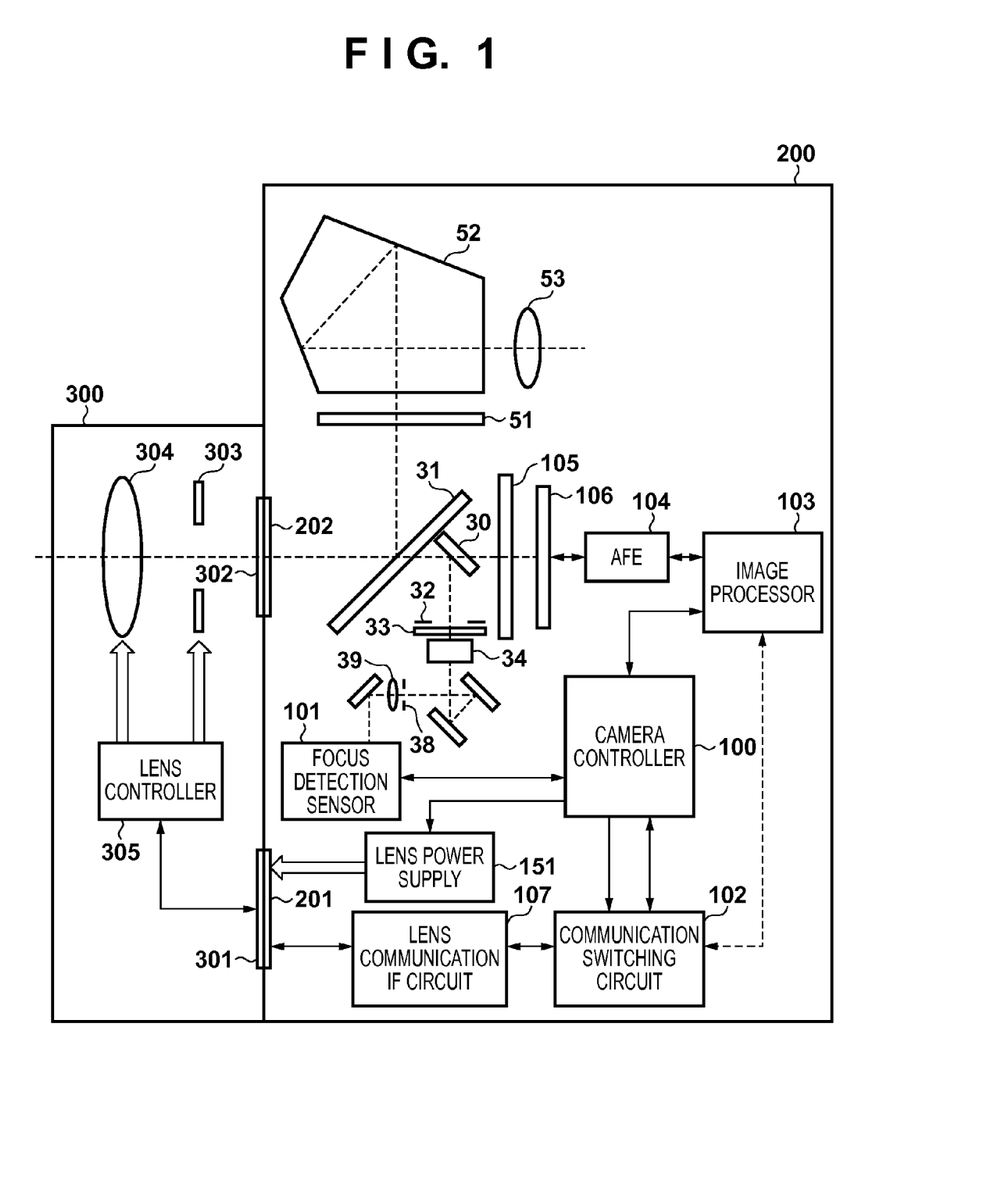
FIG. 1 is a block diagram showing a schematic configuration of an image capturing system during preparation for still image shooting according to an embodiment of the present invention.
Figure 2:
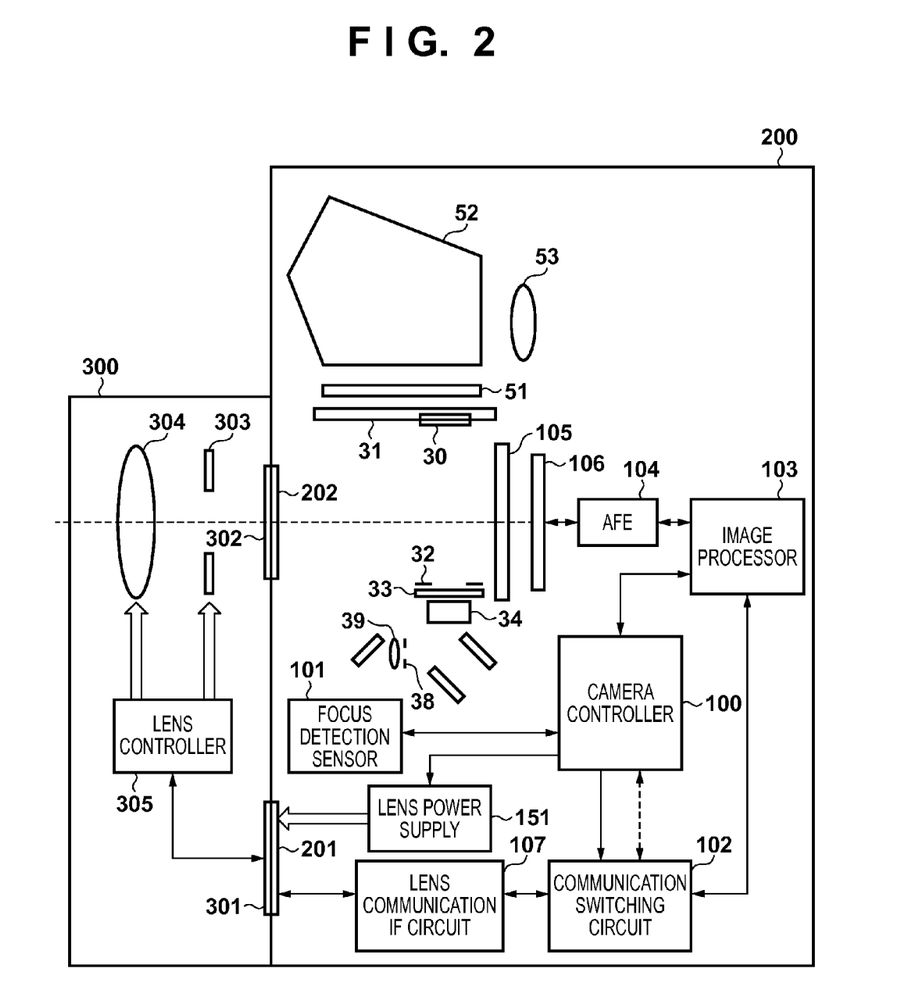
FIG. 2 is a block diagram showing a schematic configuration of the image capturing system during moving image shooting or live-view shooting according to the embodiment.

FIGS. 1 and 2 are block diagrams showing schematic configurations of an image capturing system according to an embodiment of the present invention. The image capturing system includes mainly a camera unit 200, and a lens unit 300 attachable to the camera unit 200.

The lens unit 300 is of an interchangeable lens type, and includes a connector 301, a lens mount 302, a diaphragm 303, an imaging lens 304, and a lens controller 305. The camera unit 200 and the lens unit 300 are connected with each other via a lens mount 202 and the lens mount 302. The camera unit 200 and the lens unit 300 are communicatively configured by being electrically connected with each other via a connector 201 and the connector 301.

Although the imaging lens 304 in FIG. 1 is represented as a single lens, the imaging lens 304 in reality is composed of a plurality of lenses including a focus lens (not shown in the drawings), which is an optical member used for focus control. The lens controller 305 controls the entirety of the lens unit 300. The lens controller 305 also has the function of a memory that stores, for example, a constant, a variable, and a program, which are used for operation, and a non-volatile memory that stores, for example, identification information such as a number unique to the lens unit 300, management information, functional information such as the maximum aperture, the minimum aperture, and the focal length, and various settings at the present moment and those used in the past. In addition, the lens controller 305 controls focusing performed by the imaging lens 304 to achieve the in-focus state based on AF control information that is generated within the camera unit 200 according to the focus state of the image obtained by a focus detection sensor 101 or an image processor 103, and changes the image forming point of the image of the subject projected on an imaging sensor 106. Thus, AF operation is achieved. The lens controller 305 also has the function of controlling the diaphragm 303, and the function of controlling the zooming performed by the imaging lens 304.

Note that while the lens unit 300 is being attached to the camera unit 200, a camera controller 100 supplies the lens unit 300 with power via a lens power supply 151.

Next, a description is given of configurations of the camera unit 200. FIG. 1 shows a configuration during preparation for still image shooting without display of a live view, and FIG. 2 shows a configuration during moving image shooting or live-view shooting.

<During Preparation for Still Image Shooting>

As shown in FIG. 1, during preparation for still image shooting, a large portion of the light flux from the subject that enters the camera unit 200 via an optical imaging system comprised of the imaging lens 304 and the diaphragm 303 is reflected upward by an instant-return mirror 31. Thus, the image of the subject is formed on a finder screen 51. Thus, the user can observe the image via a pentaprism 52 and an eyepiece 53.

On the other hand, a portion of the light flux that passes through the instant-return mirror 31 is reflected downward by a rear sub mirror 30, and forms an image on the focus detection sensor 101 after passing through a view field mask 32, an infrared cut filter 33, a field lens 34, a diaphragm 38, and a secondary imaging lens 39. This portion of the light flux is further divided by the secondary imaging lens 39, and the light fluxes that pass through different pupil regions of the optical imaging system are photoelectrically converted by a light receiving array (not shown), thereby a pair of image signals with a parallax are generated. Then, the camera controller 100 detects the phase difference between the pair of image signals. From the result of this detection, the focus state of the imaging lens 304 is detected.

The camera controller 100 generate information for controlling the driving of the focus lens included in the imaging lens 304 based on the obtained focus state, and performs control for driving the focus lens so as to be in the in-focus position. The camera control unit 100 controls a communication switching circuit 102 so that the camera controller 100 can communicate with the lens controller 305. Then, the camera controller 100 transmits an instruction to drive the imaging lens 304 to the lens controller 305 via the communication switching circuit 102, a lens communication IF circuit 107, and the connectors 201 and 301. The lens controller 305 drives the imaging lens 304 according to the instruction from the camera controller 100.

Here, when an instruction to perform still image shooting is given by, for example, pressing of a release button (not shown in the drawings), the instant-return mirror 31 and the sub mirror 30 are flipped up, a shutter 105 opens, and the light flux from the subject forms an image on the image sensor 106. The image sensor 106 converts the light flux thus forming the image into an electrical signal, and outputs the electrical signal to an analogue front end (AFE) 104. The AFE 104 includes, for example, a CDS circuit that removes an output noise from the electrical signal output from the image sensor 106, a nonlinear amplifier circuit that performs amplification before A/D conversion, and an A/D converter circuit that performs A/D conversion. The AFE 104 outputs the image signal converted into the digital signal to the image processor 103. The image processor 103 performs predetermined image processing such as gamma conversion on the image signal output from the AFE 104, generates image data converted to have an appropriate format for recording or displaying, and outputs the image data.

<During Moving Image Shooting and Live-View Shooting>

During moving image shooting and live-view shooting, the instant-return mirror 31 and the sub mirror 30 are kept in the flipped-up state as shown in FIG. 2. Also, the shutter 105 is kept in the full-open state. Since the instant-return mirror 31 is flipped up, the light flux is not reflected upward, and accordingly the user cannot observe the image via the pentaprism 52 and the eyepiece 53. Furthermore, the light path toward the focus detection sensor 101 disappears, and the focus detection sensor 101 cannot detect the focus state.

A large portion of the light flux from the subject, entering the camera unit 200 via the optical imaging system, is projected onto the image sensor 106 via the shutter 105. The image signal generated through the photoelectric conversion by the image sensor 106 is converted into a digital signal by the AFE 104, and is transmitted to the image processor 103. The image processor 103 calculates the contrast value from the image signal received from the AFE 104, and evaluates the focus state of the imaging lens 304. Also, the image processor 103 performs predetermined image processing such as gamma conversion on the image signal output from the AFE 104, and outputs image data converted to have an appropriate format for recording or displaying. Thus output image data are sequentially displayed on a display unit (not shown in the drawings), thereby a live-view image is obtained. While being instructed to perform moving image shooting, the pieces of image data output from the image processor 103 are recorded.

As a focus detection method using the image sensor 106, the following method may be used other than the method of calculating the contrast value based on a predetermined frequency component of the image signal and evaluating the focus state (a contrast detection method). That is, pixels that can receive portions of a light flux passing through different pupil regions of the lens unit 300 are provided on the imaging plane of the image sensor 106, the phase difference between the pair of parallax images thus obtained is calculated, and the focus state of the subject is evaluated (on-imaging plane phase difference detection method).

In the present embodiment, the camera controller 100 controls the communication switching circuit 102 so that the image processor 103 can communicate with the lens controller 305. The image processor 103 obtains the information for controlling the driving of the focus lens of the imaging lens 304 in order to bring an image into focus, and controls the lens controller 305 by transmitting thereto an instruction to drive the imaging lens 304. The lens controller 305 drives the imaging lens 304 according to the instruction from the image processor 103.

Note that when an instruction to perform still image shooting is input by the user during moving image shooting or live-view shooting, a still image is recorded by recording image data for one frame while keeping the image processor 103 in the state of communicating with the lens controller 305.

<Communication Switching Control>

Figure 3:
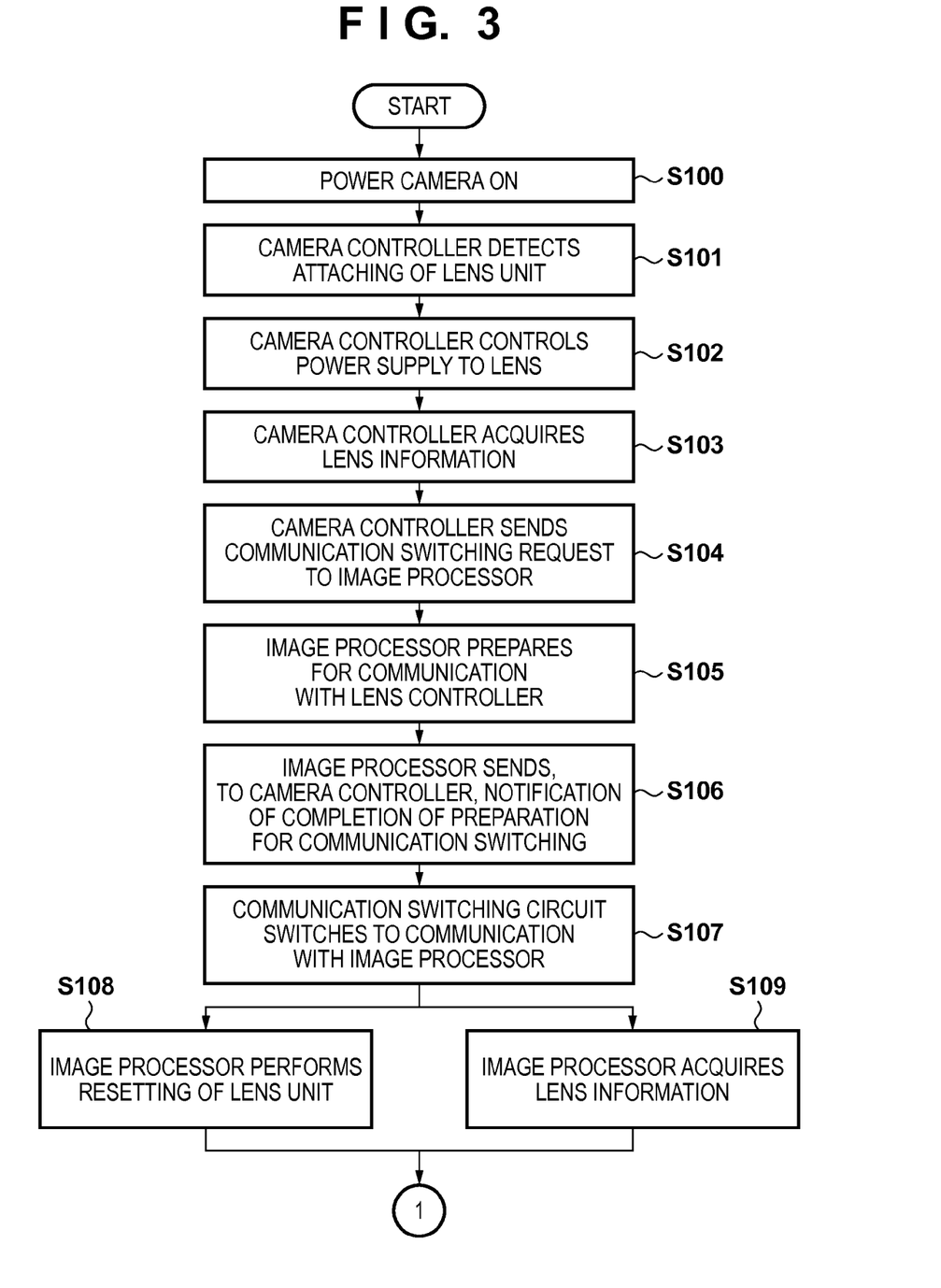
FIG. 3 is a flowchart for the initial communication with a lens controller according to the embodiment.
Figure 4:
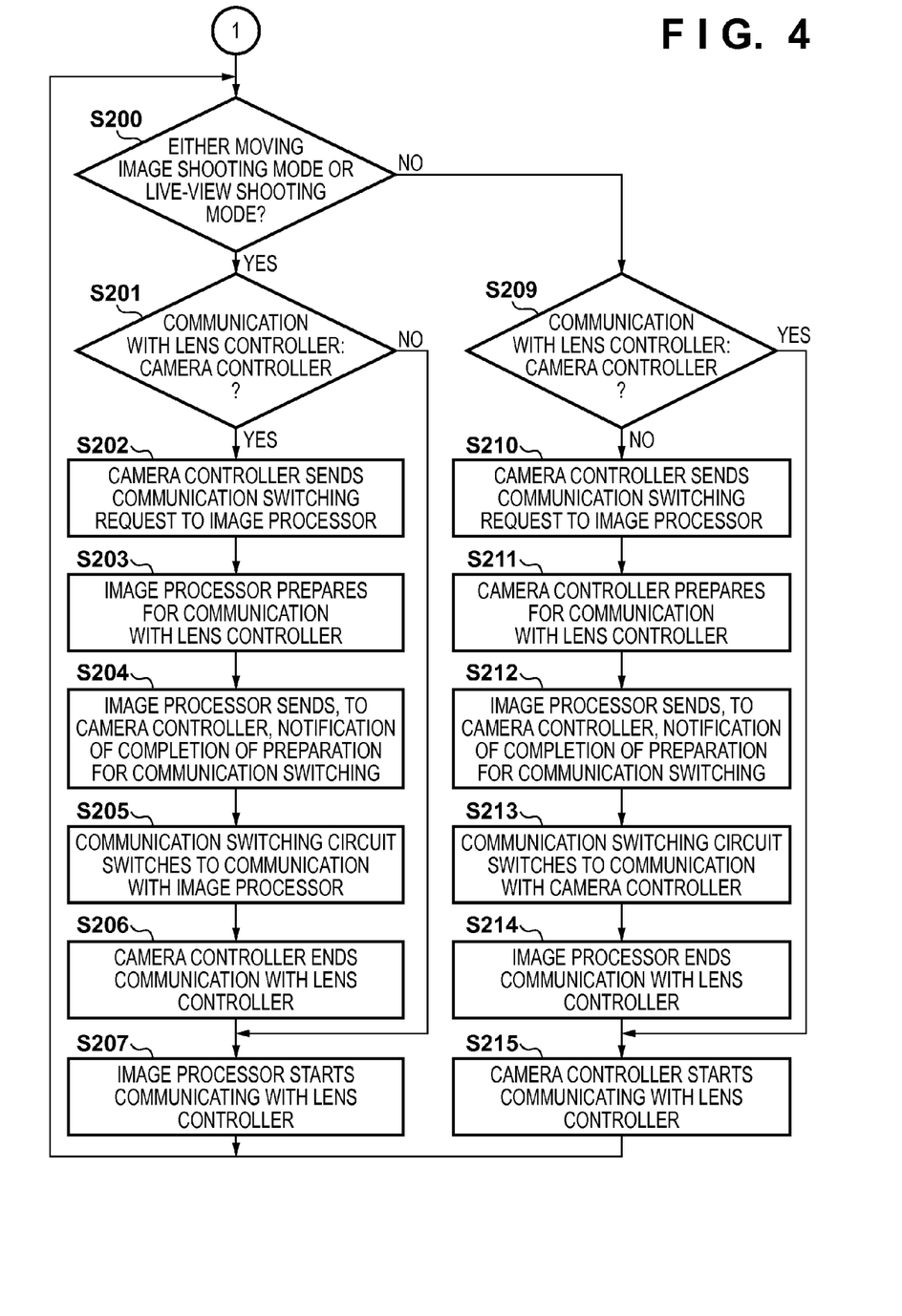
FIG. 4 is a flowchart showing communication switching procedures performed during communication with the lens controller in an image shooting mode according to the embodiment.

Next, with reference to the flowcharts shown in FIGS. 3 and 4, a description is given of control according to the present embodiment for switching between the camera controller 100 and the image processor 103 for communication with the lens controller 305. Arbitration between the camera controller 100 and the image processor 103, with respect to which of them has the right to communicate with the lens controller 305, is performed by the camera controller 100 serving as the master and the image processor 103 serving as the slave. In other words, the camera controller 100 takes on the role of determining which of the camera controller 100 and the image processor 103 should communicate with the lens controller 305. In the present embodiment, the camera controller 100 is always supplied with power, whereas the image processor 103 is not supplied with power while the camera unit 200 is being in the power-off state. In such a case, it is preferable that the camera controller 100, which is always supplied with power, performs the communication switching control as well as monitoring of the states of the lens unit 300, the switches, etc.

Figure 7:
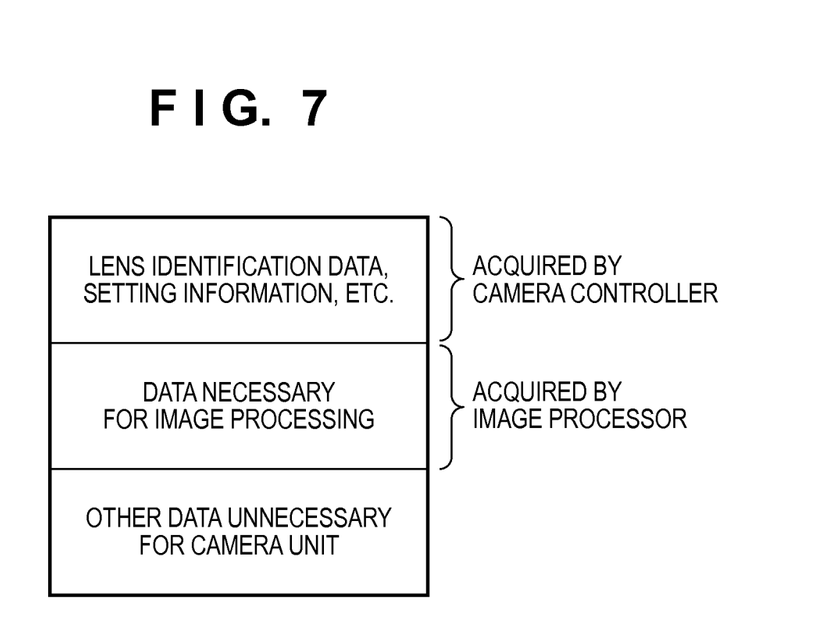
FIG. 7 is a diagram showing an example of data sets stored in a lens unit according to the embodiment.

When a battery (not shown in the drawings) is inserted into the camera unit 200 and the camera unit 200 is powered on (step S100), the camera controller 100 detects that the lens unit 300 has been or is attached to the camera unit 200 (step S101), and supplies the lens unit 300 with power (step S102). When the lens unit 300 is supplied with power, the camera controller 100 controls the communication switching circuit 102, and the camera controller 100 initiates the communication with the lens controller 305 via the communication switching circuit 102, the lens communication IF circuit 107, and the connectors 201 and 301. The camera controller 100 acquires, via the lens controller 305, necessary information such as the lens identification information, the management information, the functional information, and various settings, from among pieces of information stored in a storage unit (not shown in the drawings) inside the lens unit 300 as shown in FIG. 7 (step S103).

Figure 5:
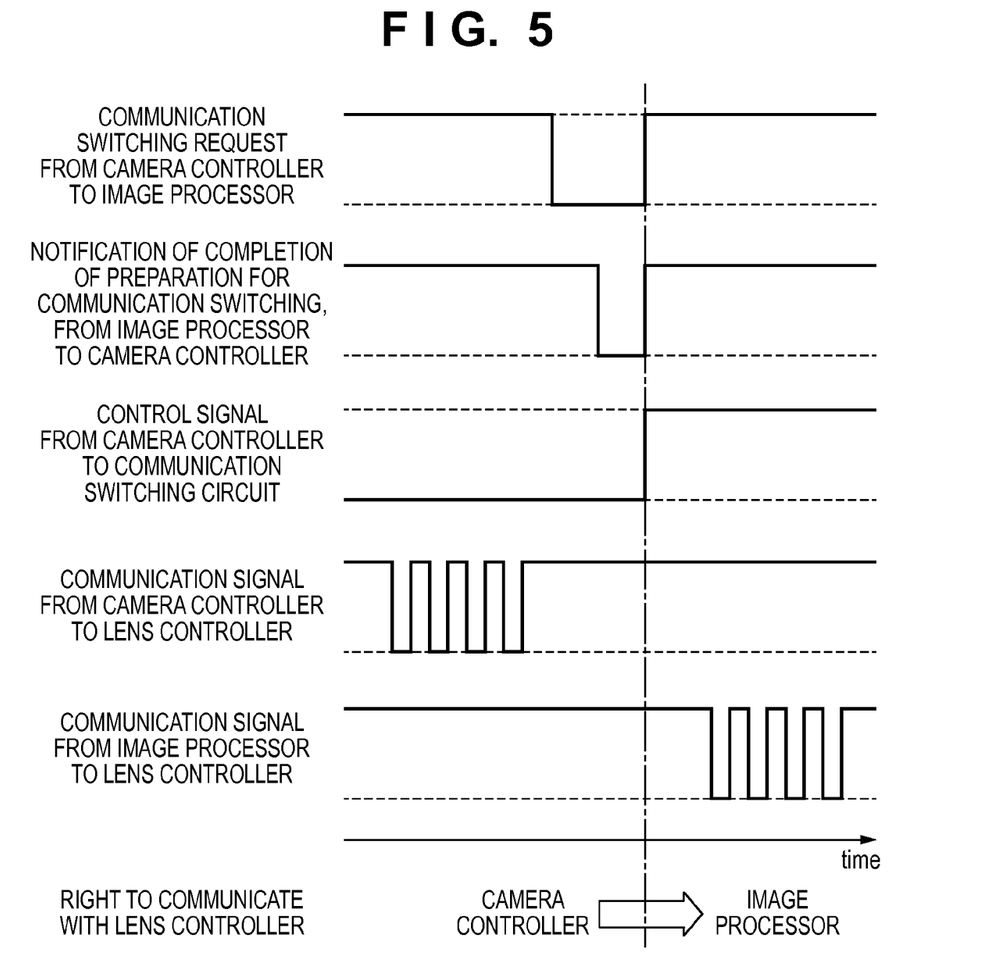
FIG. 5 is a timing chart at a time of switching from communication between the lens controller and a camera controller to communication between the lens controller and an image processor according to the embodiment.

After that, the camera controller 100 performs control for transferring the right to communicate with the lens controller 305 to the image processor 103. FIG. 5 shows the state of the control signal during the arbitration with respect to the right to communicate. Upon completion of the communication with the lens controller 305, the camera controller 100 sends a communication switching request signal to the image processor 103 (step S104). The image processor 103, upon receiving the request with the timing of the falling edge of the communication switching request signal, prepares for communication with the lens controller 305 (step S105). The image processor 103, upon completion of preparation for communication switching, sends a notification of the completion of the preparation for the communication switching, to the camera controller 100 (step S106). The camera controller 100, upon receiving the notification of the completion of the preparation for the communication switching from the image processor 103 with the timing of the falling edge, switches the control signal for the communication switching circuit 102 from the low level to the high level so that the image processor 103 can communicate with the lens controller 305. After the communication switching circuit 102 receives the control signal from the camera controller 100 and switches to the communication with the image processor 103 at step S107, the image processor 103 starts the communication with the lens controller 305.

The image processor 103, upon receipt of the right to communicate with the lens controller 305, performs resetting of the lens unit 300 (step S108). Simultaneously, the image processor 103 acquires, from the lens controller 305, the necessary data for image processing including image correction processing, from among the pieces of information stored in the storage unit (not shown in the drawings) inside the lens unit 300 as shown in FIG. 7 (step S109). Here, since the data acquired at step S109 is the information to be used by the image processor 103, the image processor 103 receives the data directly from the lens controller 305 without the mediation of the camera controller 100. Such a configuration eliminates unnecessary communication, thereby shortening the time lag caused by the communication and reducing the processing load on the camera controller 100. The lens unit 300, in response to requests from the image processor 103, namely a request for resetting and a request for outputting the necessary data for the image processing, performs the resetting and, at the same time (i.e., in parallel), outputs the necessary data for the image processing. The image processor 103, upon completion of the acquisition of the necessary data for the image processing, checks with the lens unit 300 to determine whether the resetting has been completed, and upon completion of the resetting by the lens controller 305, the camera unit 200 and the lens unit 300 start the preparation for shooting.

As described above, the acquisition of the necessary data for the image processing by the image processor 103 and the resetting of the lens unit 300 are performed in parallel, and such a configuration shortens the processing time at the starting up of the camera. Note that the resetting mentioned here is processing for initializing the positioning of the elements constituting the optical imaging system, such as lenses including a focus lens, a diaphragm, and an optical system for vibration prevention.

FIG. 4 is a flowchart showing the control after the preparation for image shooting is started. First, the camera controller 100 determines whether a still image shooting mode (not using a live view) is selected, or either a moving image shooting mode or a live-view shooting mode is selected (step S200). Note that although the following provides a description of the case of selecting the still image shooting mode, the moving image shooting mode, or the live-view shooting mode, cameras usually have other sorts of shooting modes and modes other than shooting modes such as a playback mode. Although not shown in the drawings, when any of these modes is selected, the communication with the lens unit 300 may be controlled by keeping the state at the time the determination is made, or entering the state at the start of the preparation for image shooting. In the present embodiment, the following control is performed when at least the still image shooting mode, the moving image shooting mode, or the live-view shooting mode is selected.

When the moving image shooting mode or the live-view shooting mode is selected, the camera controller 100 determines which of the camera controller 100 and the image processor 103 is communicating with the lens controller 305 (step S201). When the image processor 103 is communicating with the lens controller 305, the image processor 103 continues communicating with the lens controller 305 (step S207), and performs moving image shooting or live-view shooting.

At step S201, when it is determined that the camera controller 100 is communicating with the lens controller 305, the camera controller 100 sends a communication switching request to the image processor 103 (step S202). Here, the switching is performed according to the same procedures as described for step S104 to step S107 of FIG. 3 with reference to FIG. 5. That is, the image processor 103, upon receiving the request with the timing of the falling edge of the communication switching request signal, prepares for communication with the lens controller 305 (step S203), and upon completion of the preparation for the communication, outputs a notification of the completion of preparation for communication switching, to the camera controller 100 (step S204). The camera controller 100, upon receiving the notification from the image processor 103, controls the communication switching circuit 102 so that the image processor 103 can communicate with the lens controller 305 (step S205).

The camera controller 100, after performing control to cause the communication switching circuit 102 to perform the switching, exits the state for communication with the lens controller 305 (step S206). Then, the image processor 103 starts communicating with the lens controller 305 (step S207), and moving image shooting or live-view shooting is performed.

On the other hand, when the still image shooting mode is selected (NO at step S200), the camera controller 100 determines which of the camera controller 100 and the image processor 103 is communicating with the lens controller 305 (step S209). When it is determined that the camera controller 100 is communicating with the lens controller 305, the camera controller 100 continues communicating with the lens controller 305 (step S215). Still image shooting is performed in this state.

Figure 6:
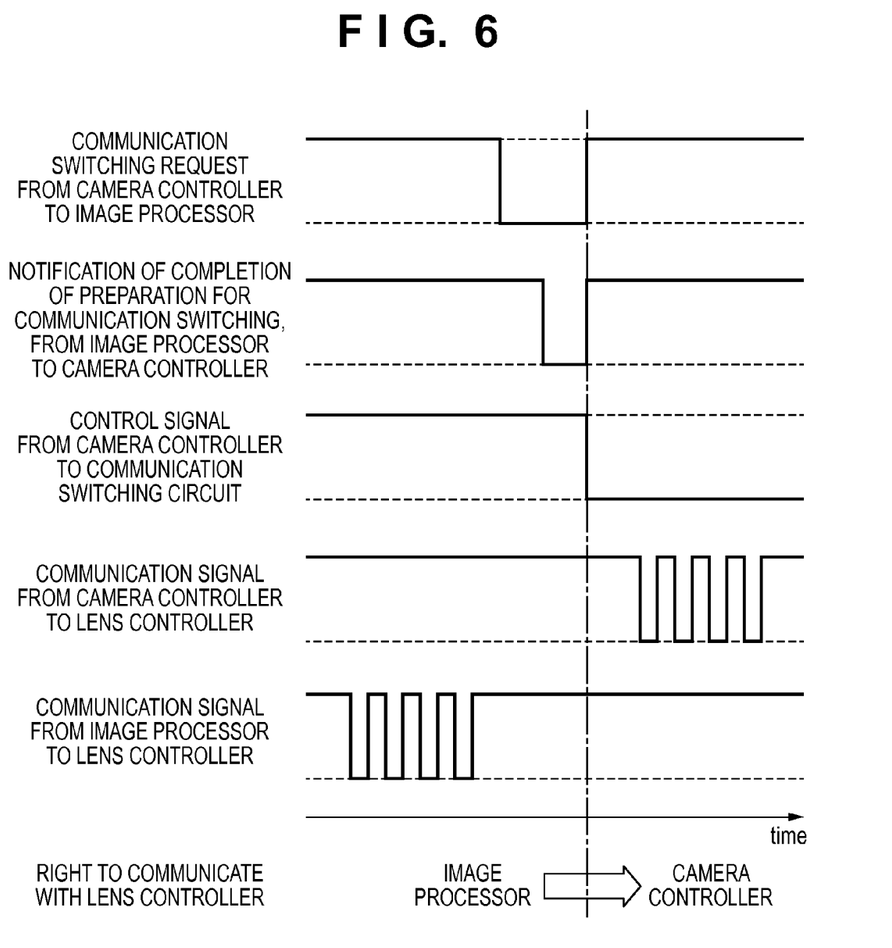
FIG. 6 is a timing chart at a time of switching from communication between the lens controller and the image processor to communication between the lens controller and the camera controller according to the embodiment.

When it is determined at step S209 that the image processor 103 is communicating with the lens controller 305, the camera controller 100 performs control for transferring the right to communicate with the lens controller 305 to the camera controller 100. FIG. 6 shows the state of the control signal at the time of switching from communication between the lens controller 305 and the image processor 103 to communication between the lens controller 305 and the camera controller 100. The camera controller 100 sends a communication switching request to the image processor 103 (step S210), and prepares for communication with the lens controller 305 (step S211). The image processor 103 receives the communication switching request from the camera controller 100 with the timing of the falling edge, ends the communication with the lens controller 305, and outputs a notification of the completion of preparation for the switching, to the camera controller 100 (step S212). The camera controller 100 receives the notification from the image processor 103 with the timing of the falling edge, and switches the control signal sent to the communication switching circuit 102 from the high level to the low level so that the camera controller 100 can communicate with the lens controller 305 (step S213).

After the camera controller 100 performs control to cause the communication switching circuit 102 to perform the switching, the image processor 103 exits the state for communication with the lens controller 305 (step S214). The camera controller 100 performs communication with the lens controller 305 (step S215). Still image shooting is performed in this state.

step S200 and the subsequent procedures are repeated until the mode of the camera unit 200 is switched to a mode other than the image shooting modes (e.g. the playback mode or other setting modes), or the camera unit 200 is powered off. This processing may be performed at regular intervals or when mode switching is detected.

As described above, the related art requires, after the image processor 103 generates an AF evaluation value according to the output from the image sensor 106, a step of transferring, via communication, the AF evaluation value to the camera controller 100 performing lens driving control. Accordingly, a time lag occurs due to the communication for transferring the AF evaluation value from the image processor 103 to the camera controller 100.

In contrast, according to the present embodiment, when performing AF according to the signal output from the image sensor 106, the image processor 103 performs the lens driving control by communicating with the lens controller 305. This configuration eliminates the necessity of the step of transmitting the AF evaluation value from the image processor 103 to the camera controller 100, and allows the image processor 103 to directly control the driving of the focus lens, thereby reducing the time lag in the lens driving control. Furthermore, since the configuration allows the image processor 103 to communicate with the lens unit 300 without the mediation of the camera controller 100, the configuration, advantageously, reduces the communication processing load on the camera controller 100, and increases the period for which the camera controller 100 can perform other processing.

In addition, according to the present embodiment, when AF is performed according to the signal output from the focus detection sensor 101, the camera controller 100 performs the lens driving control by communicating with the lens controller 305. In other words, according to the present embodiment, the camera controller 100 determines which of the camera controller 100 and the image processor 103 should communicate with the lens controller 305 and perform the lens driving control, in consideration of the AF method to be used.

Here, since the image sensor 106 outputs signals in synchronization with the vertical synchronizing signal, it is preferable to use the image processor 103 when the communication with the lens unit 300 is performed in synchronization with the vertical synchronizing signal. Such communication in synchronization with the vertical synchronizing signal is effective particularly in the case of moving image shooting and live-view shooting that require control of the focus lens and so on in synchronization with the image shooting. On the other hand, in the case of still image shooting, data communication with the lens unit 300 needs to be started promptly at any time without synchronization with vertical synchronizing signal. Therefore, in such a case, the camera controller 100 is used for the communication in the present embodiment.

Note that, in the present embodiment, although AF in the still image shooting mode is performed by using the focus detection sensor 101 and AF in the moving image shooting mode or the live-view shooting mode is performed by using the image sensor 106, the relationship between the image shooting modes and the AF methods is not limited in this way. The scope of the present invention includes any cases insofar as it is the image processor 103 that performs the communication with the lens unit 300 when controlling AF using the output from the image sensor 106.

In addition, during the initial communication with the lens controller 305 performed at the starting up of the camera, the image processor 103 acquires necessary data for image processing directly from the lens controller 305 without the mediation of the camera controller 100. The camera controller 100 therefore does not need to acquire the data from the lens controller 305 and transfer the data to the image processor 103. Consequently, the processing load of the data communication required for image processing is reduced, and accordingly the camera controller 100 can perform additional processing. Thus, advantageously, the time required for the initial communication is reduced, and the time required for completing the preparation for image shooting is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-099833, filed on May 13, 2014 which is hereby incorporated by reference herein in its entirety.

What is claimed is:

1. An image capturing apparatus to which a lens unit having an optical imaging system is attachable, comprising:
an image sensor configured to generate an image signal by performing photoelectric conversion on a light flux passing through the optical imaging system;
a processor performing the functions of a first calculation unit, the first calculation unit configured to obtain first control information for focus control by using a signal output from the image sensor;
a controller performing the functions of a second calculation unit, the second calculation unit configured to perform communication control between the lens unit and the image capturing apparatus, obtain second control information for focus control without using a signal output from the image sensor, and transmit the second control information to the lens unit; and
a communication switching circuit performing the functions of a switching unit, the switching unit configured to switch between the first calculation unit and the second calculation unit that communicates with the lens unit,
wherein the first calculation unit transmits the first control information to the lens unit without mediation of the second calculation unit, and
wherein the second calculation unit determines which of the first calculation unit and the second calculation unit is to be used for communication with the lens unit, and outputs a signal for controlling the switching unit.

2. The image capturing apparatus according to claim 1, wherein the first calculation unit includes an image processing unit that converts the image signal to image data.

3. The image capturing apparatus according to claim 2, wherein the first calculation unit acquires, from the lens unit, first lens information used for image processing performed by the image processing unit.

4. The image capturing apparatus according to claim 1, wherein the first, calculation unit obtains the first control information by calculation according to a contrast of the image signal.

5. The image capturing apparatus according to claim 1, wherein the image sensor generates a pair of image signals by receiving a pair of light fluxes passing through different pupil regions of the optical imaging system, and
wherein the first calculation unit obtains the first control information by calculation according to a phase difference between the pair of image signals output by the image sensor.

6. The image capturing apparatus according to claim 1 further comprising a sensor unit configured to divide a light flux entering via the optical imaging system into a pair of light fluxes having a parallax, and generate a pair of signals by receiving the pair of light fluxes,
wherein the second calculation unit obtains the second control information by calculation according to a phase difference between the pair of signals output by the sensor unit.

7. The image capturing apparatus according to claim 1, wherein the second calculation unit determines which of the first calculation unit and the second calculation unit is to be used for communication with the lens unit according to an image shooting mode.

8. The image capturing apparatus according to claim 7, wherein the second calculation unit determines to use the first calculation unit to communicate with the lens unit when an image shooting mode for acquiring the image signal at regular intervals is set.

9. The image capturing apparatus according to claim 7, wherein the second calculation unit determines to use the second calculation unit to communicate with the lens unit when a still image shooting mode is set, and determines to use the first calculation unit to communicate with the lens unit when a moving image shooting mode or a live-view shooting mode is set.

10. The image capturing apparatus according to claim 1, wherein the second calculation unit acquires, from the lens unit, second lens information including lens identification information.

11. The image capturing apparatus according to claim 10, wherein, when the image capturing apparatus is powered on, the second calculation unit detects the lens unit being attached, supplies power to the lens unit, and performs communication for acquiring the second lens information from the lens unit.

12. The image capturing apparatus according to claim 1, wherein the first calculation unit transmits, to the lens unit, information instructing to perform resetting of the optical imaging system.

13. A lens unit that is attachable to the image capturing apparatus according to claim 1, comprising:
   an optical imaging system; and
   a lens control unit configured to perform communication with the image capturing apparatus, and to control driving of the optical imaging system,
   wherein the lens control unit transmits, to the first calculation unit, first lens information used for image processing.

14. The lens unit according to claim 13, wherein the lens control unit receives, from first calculation unit, information instructing to perform resetting of the optical imaging system.

15. The lens unit according to claim 14, wherein the lens control unit performs the transmission of the first lens information and the resetting of the optical imaging system in parallel.

16. The image capturing apparatus according to claim 1, wherein the communication control for determining which of the first calculation unit and the second calculation unit is to communicate with the lens unit is performed with the second communication unit searing as a master and the first communication unit serving as a slave.

17. The image capturing apparatus according to claim 1, wherein the second calculation unit obtains the second control information stored in the lens unit by communicating with the lens unit when the image capturing apparatus is turned on,
   the switching unit switches to the first calculation unit after the second calculation unit obtains the second lens information, and
   when the communication to the lens unit is changed from the second calculation unit to the first calculation unit by the switching unit, the first calculation unit obtains the first lens information, stored in the lens unit, that is different from the second lens information.

18. The image capturing apparatus according to claim 17, wherein the second lens information includes lens identification information, and the first lens information includes information for image correction processing.

19. The image capturing apparatus according to claim 1, wherein the second calculation unit supplies power to the lens unit.

20. A method for controlling an image capturing apparatus to which a lens unit having an optical imaging system is attachable and that includes an image sensor that generates an image signal by performing photoelectric conversion on a light flux passing through the optical imaging system, the method comprising:
   obtaining, by a processor which performs the functions of a first calculation unit, first control information for focus control by using a signal output from the image sensor;
   obtaining, by a controller which performs the functions of a second calculation unit, second control information for focus control without using a signal output from the image sensor;
   determining, in the second calculation unit, which of the first calculation unit and the second calculation unit is to be used for communication with the lens unit, and outputting a signal for controlling a switching unit;
   switching, by a communication switching circuit which performs the functions of a switching unit, to switch the first calculation unit and the second calculation unit that communicates with the lens unit; and
   transmitting the second control information from the second calculation nit to the lens unit or
   the first control information from the first calculation unit to the lens unit without mediation of the second calculation unit in accordance with a result of the switching.

21. An image capturing system, comprising:
   a lens unit having, an optical imaging system;
   age sensor configured to generate image signal by performing photoelectric conversion on a light flux passing through the optical imaging system;
   a processor performing the functions of a first calculation unit, the first calculation, unit configured to obtain first control information for focus control by using a signal output from the image sensor;
   a controller performing the functions of a second calculation unit, the second calculation unit configured to perform communication control between the lens unit and the image capturing apparatus, obtain second control information for focus control without using a signal output from the image sensor, and transmit the second control information to the lens unit; and
   a communication switching circuit performing the functions of a switching unit, the switching unit configured to switch between the first calculation unit and the second calculation unit that communicates with the lens unit,
   wherein the first calculation unit transmits the first control information to the lens unit without mediation of the second calculation unit, and
   wherein the second calculation unit determines which of the first calculation unit and the second calculation unit is to be used for communication with the lens unit, and outputs a signal for controlling the switching unit.

* * * * *